United States Patent [19]
Blomstrom et al.

[11] 3,980,149
[45] Sept. 14, 1976

[54] STRESS-RELIEVED AXLE MOUNTING FOR TRACK-TYPE VEHICLES

[75] Inventors: Gary D. Blomstrom, Waverly, Nebr.; Thomas E. Cochran, Yorkville, Ill.; Mohamed Abdel-Fattah Abdel-Latif, Aurora, Ill.; Lyle E. York, Peoria, Ill.

[73] Assignee: Caterpillar Tractor Co., Peoria, Ill.

[22] Filed: May 12, 1975

[21] Appl. No.: 576,812

[52] U.S. Cl. .................................. 180/9.5; 308/72
[51] Int. Cl.[2] ........................................ B62D 55/08
[58] Field of Search ................ 180/9.5, 9.52, 9.54, 180/9.56, 9.58, 6.7; 308/72

[56] References Cited
UNITED STATES PATENTS

| | | | |
|---|---|---|---|
| 2,948,347 | 8/1960 | Risk | 180/9.5 |
| 3,117,647 | 1/1964 | Polko | 180/9.5 |
| 3,225,849 | 12/1965 | La Casse | 180/9.5 |
| 3,700,295 | 10/1972 | Butzow | 308/72 |
| 3,700,298 | 10/1972 | Hay | 308/72 |
| 3,825,088 | 7/1974 | Copeland | 180/9.5 |
| 3,828,873 | 8/1974 | Oestmann | 180/9.5 |
| 3,873,166 | 3/1975 | Berg | 308/72 |

*Primary Examiner*—M. H. Wood, Jr.
*Assistant Examiner*—John A. Carroll
*Attorney, Agent, or Firm*—Phillips, Moore, Weissenberger, Lempio & Strabala

[57] ABSTRACT

A track-type vehicle comprises a main frame having a pair of laterally spaced track roller frames pivotally mounted on either side thereof. The rearward ends of the track roller frames are pivotally mounted for vertical movements on opposite ends of an axle extending transversely therebetween. The axle is mounted on the main frame by a pair of self-aligning spherical bearing assemblies.

8 Claims, 4 Drawing Figures

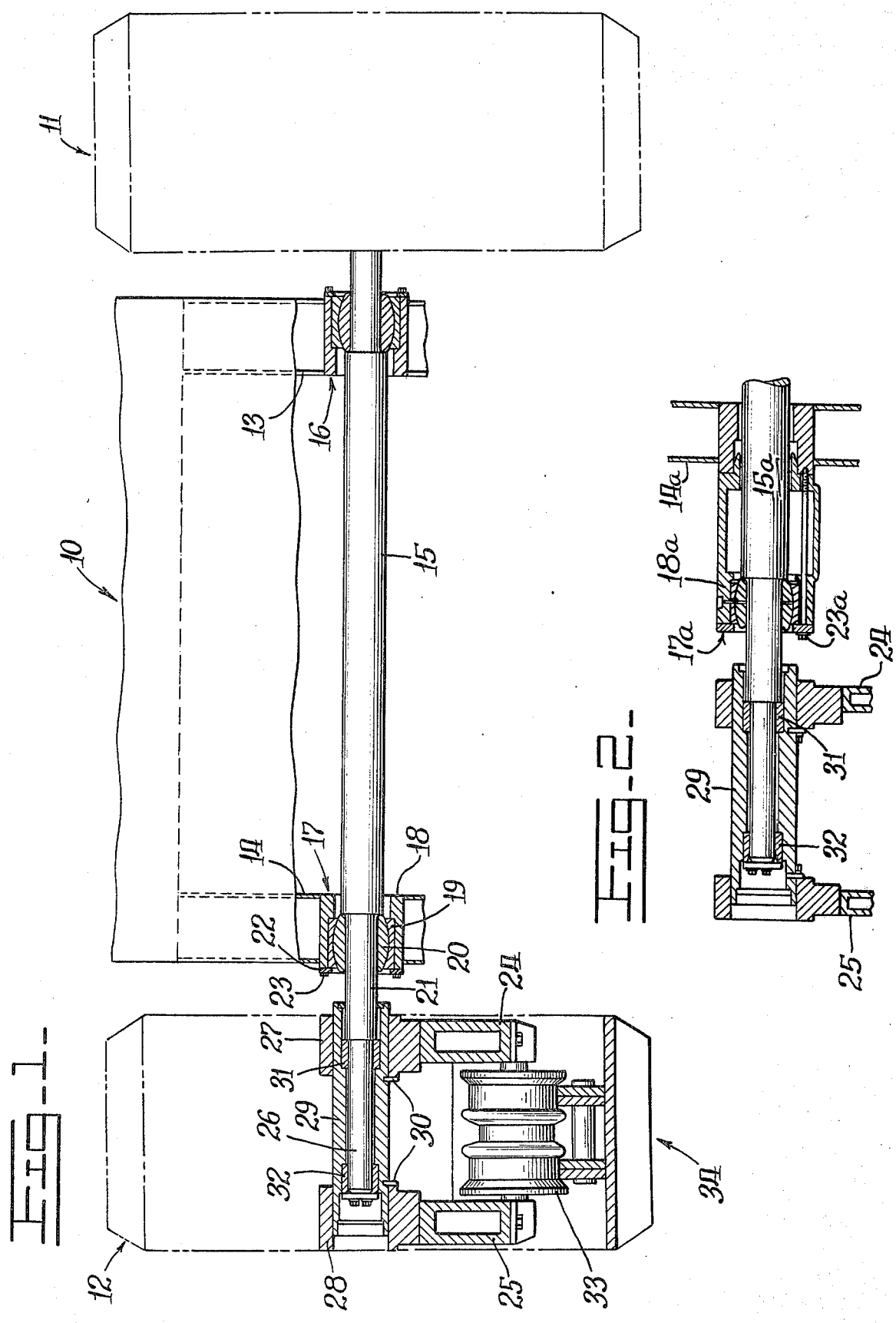

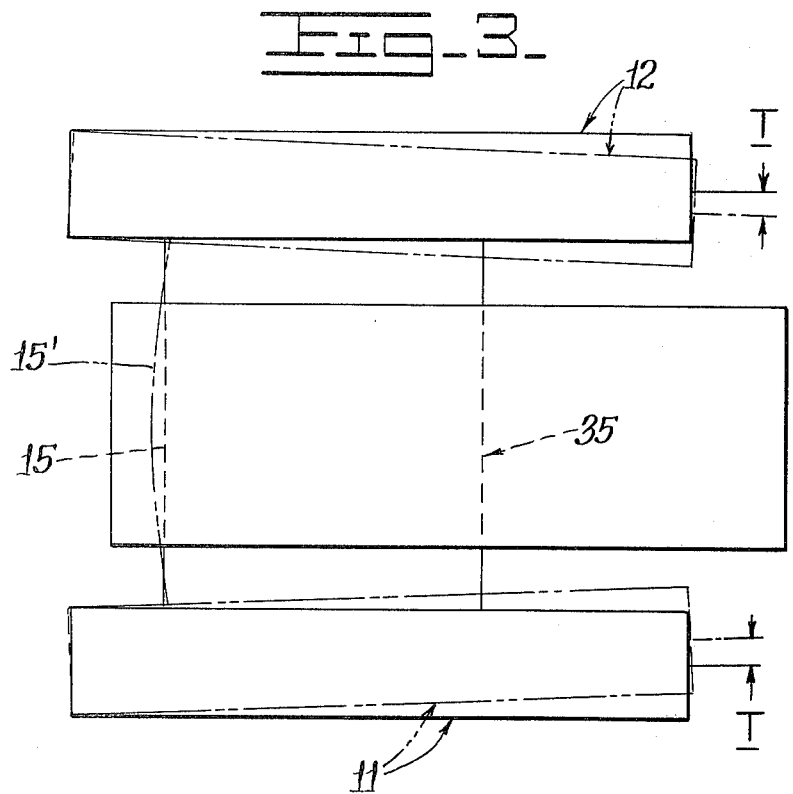
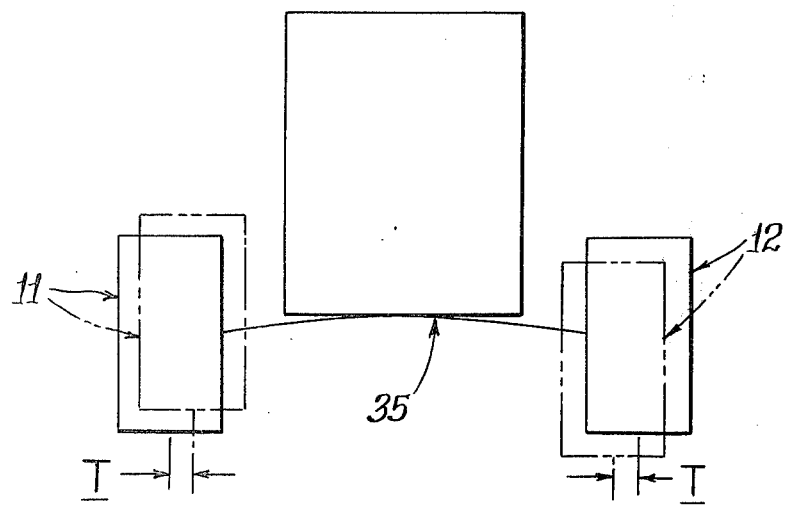

STRESS-RELIEVED AXLE MOUNTING FOR TRACK-TYPE VEHICLES

BACKGROUND OF THE INVENTION

Track-type tractors comprise a main frame having a track roller frame mounted on either side thereof. The rearward ends of the track roller frames are normally each pivotally mounted on the main frame to permit the track roller frames to pivot vertically when the tractor traverses uneven terrain. The forward ends of the track roller frames are operatively associated with the main frame by means of an equalizer bar mounting assembly, such as one of the types disclosed in U.S. Pat. Nos. 2,978,050 and 3,010,530, both assigned to the assignee of this application. Upon oscillation of the equalizer bar about its centrally disposed pivot axis, the track roller frames tend to "toe-in" slightly. Such "toe-in" imposes substantial stresses on the connections whereat the rearward ends of the track roller frames mount on the main frame.

SUMMARY AND OBJECTS OF THIS INVENTION

An object of this invention is to provide economical, non-complex and stress-relieved mounting means for movably mounting the rearward ends of a pair of track roller frames on a main frame of a track-type vehicle. In the preferred embodiment of this invention, the rearward end of each of the track roller frames is pivotally mounted on the end of a flexible axle and the axle is further mounted on the main frame by a pair of self-aligning bearing assemblies.

BRIEF DESCRIPTION OF THE DRAWINGS

Other objects of this invention will become apparent from the following description and accompanying drawings wherein:

FIG. 1 is a partially sectioned rear elevational view of a portion of a rearward end of a track-type tractor, incorporating the stress-relieved axle mounting of this invention therein;

FIG. 2 is a modification of the axle mounting; and

FIGS. 3 and 4 are top plan and front elevational views, respectively, schematically illustrating operational movements of track roller frames employed on the tractor.

DETAILED DESCRIPTION

FIG. 1 discloses a portion of a rearward end of a track-type tractor comprising a main frame 10 having a pair of endless track assemblies 11 and 12 disposed on either side thereof. Since the track assemblies are substantially identical, the details of only one track assembly will be described in some detail hereinafter. The main frame comprises a pair of laterally spaced and longitudinally extending main rails 13 and 14 having a transversely extending axle 15 mounted thereon by stress-relieved mounting means 16 and 17, respectively. The axle is composed of a suitably heat treated steel material which will exhibit the desired strength, flexure and related physical properties well known to those skilled in the art for purposes hereinafter explained. Although each of the track assemblies could be suitably mounted on an independent axle, a single common axle 15 is preferably employed therefor.

Each mounting means preferably comprises a self-aligning spherical bearing assembly including a tubular housing 18 secured to a respective rail of the main frame, an annular shoe 19 and an annular spherical bearing 20 mounted on a first reduced end portion 21 of axle 15 and disposed for relative movements in the shoe. An annular retaining or end plate 22 is releasably attached to an outboard side of housing 18 by a plurality of circumferentially disposed cap screws 23 and overlaps shoe 19 to hold the bearing parts in place. As will be hereinafter more fully explained in connection with FIGS. 3 and 4, mounting means 16 and 17 cooperate to permit the axle to bend slightly relative to the main frame to compensate for "toe-in" of the sub-frames when they pivot in a vertical plane during vehicle operation.

Each track assembly comprises a track roller frame or sub-frame composed of a pair of laterally spaced and longitudinally extending inner and outer rails 24 and 25, respectively. An outboard or second reduced end 26 of axle 15 mounts a respective sub-frame thereon by a pair of laterally spaced brackets 27 and 28 welded to rails 24 and 25, respectively. A tubular sleeve 29 is secured in place between the brackets by a pair of keys 30.

A pair of axially spaced bearing bushings or bearing means 31 and 32, fixedly mounted in sleeve 29 to provide pivot means therewith, pivotally mount the sub-frame for vertical movements on the axle. A plurality of standard track rollers 33 (one shown) are rotatably mounted and longitudinally spaced along the sub-frame to support the vehicle on a ground-engaging endless track 34 in a conventional manner.

FIG. 2 discloses a modification of the FIG. 1 stress-relieved mounting means wherein like numerals depict corresponding constructions, but with certain FIG. 2 numerals being accompanied by an *a* to depict modified constructions. The FIG. 2 modification essentially differs from the FIG. 1 axle mounting in that it further comprises an extended housing 18a for accommodating a self-aligning spherical bearing assembly or mounting means 17a therein. Housing 18a is releasably attached to a side of a rail 14a of the main frame by a plurality of circumferentially disposed and elongated bolts 23a. The extension of the axle, laterally outwardly from the main frame, facilitates the use of low ground profile (LGP) track shoes (not shown) for endless track 34 (FIG. 1).

Referring to FIGS. 3 and 4, it should be noted that the universal freedom of movement afforded to flexible axle 15 at mounting means 16 and 17 will permit the axle to bend slightly in a horizontal plane to its 15' configuration when the vehicle transverses uneven terrain. In particular, forward ends of track assemblies 11 and 12, mounted on the front of frame 10 by a schematically illustrated equalizer bar mounting assembly 35 of the type disclosed in the above-mentioned patents, will tend to "toe-in" (T) slightly when they pivot vertically on the axle. Therefore, such bending movement of the axle will prevent mounting means 16 and 17 from being subjected to undue stresses to substantially increase the service life of the mounting means as well as the vehicle's attendant mechanisms. The FIG. 2 mounting means functions in substantially the same manner.

I claim:

1. In a track-type vehicle of the type comprising a main frame, a pair of laterally spaced track assemblies disposed on either side of said main frame, an equalizer bar assembly operatively connecting forward ends of said track assemblies to said main frame and pivot means pivotally mounting a rearward end of each of said track assemblies on an axle means for permitting such track assembly to pivot vertically relative to said main frame, the improvement comprising mounting means movably mounting said axle means on said main frame to cooperate with said pivot means for permitting said axle means to move slightly relative to said main frame when said sub-frames pivot relative to each other to cause "toe-in" at forward ends thereof.

2. The vehicle of claim 1 wherein the axle means mounting each of said track assemblies on said main frame constitutes a common, flexible axle extending transversely through said main frame and pivotally mounting said track assemblies on opposite ends thereof.

3. The vehicle of claim 1 wherein each of said mounting means comprises a self-aligning spherical bearing assembly.

4. The vehicle of claim 3 wherein said main frame comprises a pair of laterally spaced rails each having a said bearing assembly mounted thereon.

5. The vehicle of claim 3 wherein each bearing assembly comprises a tubular housing secured to said frame, an annular shoe mounted in said housing and an annular spherical bearing mounted on said axle means and disposed for relative movements in said shoe.

6. The vehicle of claim 5 wherein each bearing asembly further comprises an annular plate releasably attached to an outboard side of said housing to overlap said shoe.

7. The vehicle of claim 1 wherein each of said pivot means comprises a tubular sleeve secured to a respective track assembly and bearing means pivotally mounting said sleeve on said axle.

8. The vehicle of claim 7 wherein said bearing means comprises a pair of axially spaced bearing bushings fixedly mounted in said sleeve.

* * * * *